(12) United States Patent
Tsuzaki et al.

(10) Patent No.: US 6,819,477 B2
(45) Date of Patent: Nov. 16, 2004

(54) RAMAN AMPLIFIER MODULE AND OPTICAL TRANSMISSION SYSTEM USING THE SAME

(75) Inventors: Tetsufumi Tsuzaki, Yokohama (JP); Masayuki Nishimura, Yokohama (JP); Masaaki Hirano, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/911,767

(22) Filed: Jul. 25, 2001

(65) Prior Publication Data

US 2002/0012161 A1 Jan. 31, 2002

(30) Foreign Application Priority Data

Jul. 25, 2000 (JP) .................... P2000-224154

(51) Int. Cl.[7] .............................. H01S 3/108

(52) U.S. Cl. .................... 359/334; 359/333

(58) Field of Search .................. 359/333, 334, 359/337, 341.1

(56) References Cited

U.S. PATENT DOCUMENTS

| | | | | |
|---|---|---|---|---|
| 5,539,563 A | * | 7/1996 | Park | 398/148 |
| 5,675,429 A | * | 10/1997 | Henmi et al. | 398/178 |
| 5,696,614 A | | 12/1997 | Ishikawa et al. | 359/124 |
| 5,793,917 A | * | 8/1998 | Yoshimura | 385/100 |
| 5,883,736 A | | 3/1999 | Oshima et al. | 359/341 |
| 5,887,093 A | * | 3/1999 | Hansen et al. | 385/27 |
| 6,172,803 B1 | * | 1/2001 | Masuda et al. | 359/337.12 |
| 6,292,288 B1 | * | 9/2001 | Akasaka et al. | 359/124 |
| 6,334,020 B1 | * | 12/2001 | Fujimori et al. | 385/134 |
| 6,433,925 B1 | * | 8/2002 | Sakano et al. | 359/341.43 |
| 2002/0001123 A1 | * | 1/2002 | Miyakawa et al. | 359/334 |

FOREIGN PATENT DOCUMENTS

| | | | | |
|---|---|---|---|---|
| JP | 2000-151507 A | 5/2000 | .......... | H04B/10/02 |
| WO | WO 99/43107 | 8/1999 | .......... | H04B/10/17 |

OTHER PUBLICATIONS

Spirit et al. IEE Proceedings, vol. 137, Pt. J, No. 4, Aug. 1990.*
Jie et al. APCC/OECC '99. Oct. 18–22, 1999. vol. 2.*
Nakanishi et al. Furukawa Review No. Apr. 19, 2000.*
Hainberger et al. OFC 2001, Mar. 17–22, 2001 vol. 1, MI5/1–MI5/4.*
Miyakawa et al. OFCC 2000, Mar. 7–10, 2000 vol. 4, 44–46.*
Morita et al. Elec. Letts. Apr. 12, 2001, vol. 37 No. 8.*
Matsuda et al. Elec. Letts. Feb. 15, 2001, vol. 37, No. 4.*
Miyakawa et al. OFC 2001, Mar. 17–22, 2001, vol. 4.*
Takara et al. CLEO '01, May 6–11, 2001.*
Chaudhry et al. Elec. Letts. Nov. 24, 1994, vol. 30, No. 24.*
Guild et al. Elec. Letts. Oct. 24, 1996, vol. 32 No. 22.*

(List continued on next page.)

*Primary Examiner*—Thomas G. Black
*Assistant Examiner*—Stephen Cunningham
(74) *Attorney, Agent, or Firm*—McDermott Will & Emery LLC (57) ABSTRACT

An optical transmission path in a Raman gain module (1) for transmitting signal light input from an input terminal (1a) and Raman-amplifying the signal light by pumping light supplied from pumping light source units (21, 22) is formed by connecting in series two Raman amplification optical fibers (11, 12) having different wavelength dispersion values. According to this arrangement, wavelength dispersion in the amplifier module (1) can be controlled using, e.g., the combination of the wavelength dispersion values of the Raman amplification optical fibers (11, 12). Hence, accumulation of dispersion into signal light and signal light transmission in an almost zero dispersion state are prevented, and degradation in signal light transmission quality due to the nonlinear optical effect is suppressed.

14 Claims, 7 Drawing Sheets

OTHER PUBLICATIONS

Morita et al. OFCC 2001, Mar. 17–22, 2001 vol. 2.*
Mollenauer. Nonlinear Optics: Maters., Funds., and Apps. 2000, Aug. 6–10, 2000.*
Gunkel et al. Elec. Letts. May 10, 2001, vol. 37 No. 10.*
Zho et al. Elec. Letts. Oct. 26, 2000 vol. 36, No. 22.*
Knudsen et al. Elec. Letts. Jul. 19, 2001 vol. 37, No. 15.*
Grigoryan. Elec. Letts. Apr. 13, 2000 vol. 36, No. 8.*
S.A.E. Lewis, F. Koch, S.V. Chernikov, and J.R. Taylor, "Low–Noise High Grain Dispersion Compensating Broadband Raman Amplifier," Femtosecond Optics Group, Imperial College Physics Department, London SW7 2BZ, pp. TuA2–1/5–TuA2–3/7.

Wan, P. et al. "Double Rayleigh backscattering in long–haul transmission systems employing distributed and lumped fibre amplifiers." Electronics Letters, IEEE Mar. 2, 1995, vol. 31, No. 5, pp. 383–384.

* cited by examiner

RAMAN AMPLIFIER MODULE AND OPTICAL TRANSMISSION SYSTEM USING THE SAME

BACKGROUND OF THE INVENTION

1. Field of the Invention

The present invention relates to a Raman gain module for Raman-amplifying signal light by pumping light and an optical transmission system using the same.

2. Related Background Art

An optical fiber amplifier optically amplifies signal light transmitted through the optical fiber transmission path of an optical transmission system so as to compensate for a transmission loss in the optical transmission path. The optical fiber amplifier installed on the optical transmission path comprises an optical amplification optical fiber which also functions as an optical transmission path and a pumping light supply means for supplying pumping light to the optical amplification optical fiber. When signal light is input to the optical amplification optical fiber to which the pumping light is being supplied, the signal light is optically amplified by the optical amplification optical fiber and output.

For such an optical fiber amplification, a rare-earth-element-doped fiber amplifier in which a rare earth element such as Er (erbium) is doped and a Raman amplifier using a Raman amplification phenomenon by induced Raman scattering are used.

For the rare-earth-element-doped fiber amplifier (e.g., EDFA: Erbium-Doped Fiber Amplifier), an optical fiber (e.g., EDF; Erbium-Doped Fiber) in which a rare earth element is doped is used as an optical amplification optical fiber. This fiber amplifier is installed in, e.g., a relay station of the optical transmission system as a module. On the other hand, in the Raman amplifier, a silica-based optical fiber that constructs the optical fiber transmission path is used as a Raman amplification optical fiber.

SUMMARY OF THE INVENTION

The above-described Raman amplifier can be constituted as a distributed-type optical amplifier which inputs pumping light to an optical fiber for optical transmission together with signal light and compensates for a transmission loss by Raman amplification. In addition, like an EDFA, the Raman amplifier can be installed at a predetermined position in, e.g., a relay station on the optical transmission path as a module and used as a lumped-type optical amplifier module for optically amplifying input signal light by a predetermined net gain to obtain output signal light.

However, when the Raman amplifier is used as a lumped optical amplifier, since the Raman amplification optical fiber necessary for optical amplification is longer than an EDFA or the like, the influence of a nonlinear optical effect such as self phase modulation or four wave mixing becomes large. For this reason, the degradation in signal light transmission quality due to the nonlinear optical effect in the Raman amplification optical fiber becomes conspicuous.

The present invention has been made in consideration of the above problem, and has as its object to provide a lumped Raman gain module in which degradation in signal light transmission quality due to the nonlinear optical effect is suppressed, and an optical transmission system using the Raman gain module.

In order to achieve the above object, according to the present invention, there is provided (1) a Raman gain module for Raman-amplifying signal light in a predetermined amplification wavelength band by pumping light, characterized by comprising (2) a plurality of Raman amplification optical fibers connected in series to Raman-amplify the signal light in the amplification wavelength band and having different wavelength dispersion values, (3) one or a plurality of pumping light supply means for supplying the pumping light to the plurality of Raman amplification optical fibers, respectively, and (4) a housing for accommodating the plurality of Raman amplification optical fibers and the one or plurality of pumping light supply means.

In a lumped Raman amplifier formed using a single Raman amplification optical fiber, wavelength dispersion in the amplifier module cannot be controlled because of its arrangement. Hence, depending on the value of wavelength dispersion of the Raman amplification optical fiber, such an optical transmission condition may be generated that the dispersion value accumulated in signal light during transmission through the Raman amplification optical fiber becomes large or the signal light is transmitted through the Raman amplification optical fiber in an almost zero dispersion state.

When the dispersion value of the signal light becomes large, SPM (Self Phase Modulation) or GVD (Group Velocity Dispersion) occurs. When the signal light is transmitted in an almost zero dispersion state, XPM (Cross Phase Modulation) or FWM (Four Wave Mixing) occurs. When such a nonlinear optical effect occurs during transmission through the Raman amplification optical fiber, the signal light transmission quality degrades due to the influence.

To the contrary, in the above-described Raman gain module, a lumped Raman amplifier is formed using a plurality of Raman amplification optical fibers that are connected in series and have different wavelength dispersion values. With this arrangement, wavelength dispersion in the optical transmission path in the amplifier can be controlled, and accumulation of dispersion into signal light and transmission in an almost zero dispersion state can be reduced. Hence, a Raman gain module can be implemented in which degradation in signal light transmission quality in the amplifier due to the nonlinear optical effect is suppressed.

According to the present invention, there is also provided an optical transmission system characterized by comprising an optical transmission path formed using an optical fiber through which signal light is transmitted, wherein the above-described Raman gain module is installed in a relay station for relaying the signal light transmitted through the optical transmission path.

When a Raman gain module having the above arrangement is used as a lumped optical amplifier installed in a relay station of an optical transmission system, an optical transmission system which can suppress degradation in signal light transmission quality and reliably transmit the signal light from the transmission station to the reception station can be implemented.

DESCRIPTION OF THE PREFERRED EMBODIMENTS

Preferred embodiments of a Raman gain module according to the present invention and an optical transmission system using the Raman gain module will be described below in detail with reference to the accompanying drawings. The same reference numerals denote the same elements throughout the drawings, and a repetitive description thereof will be omitted. The dimensional ratio in the drawings does not always match that in the description.

Figure 1:
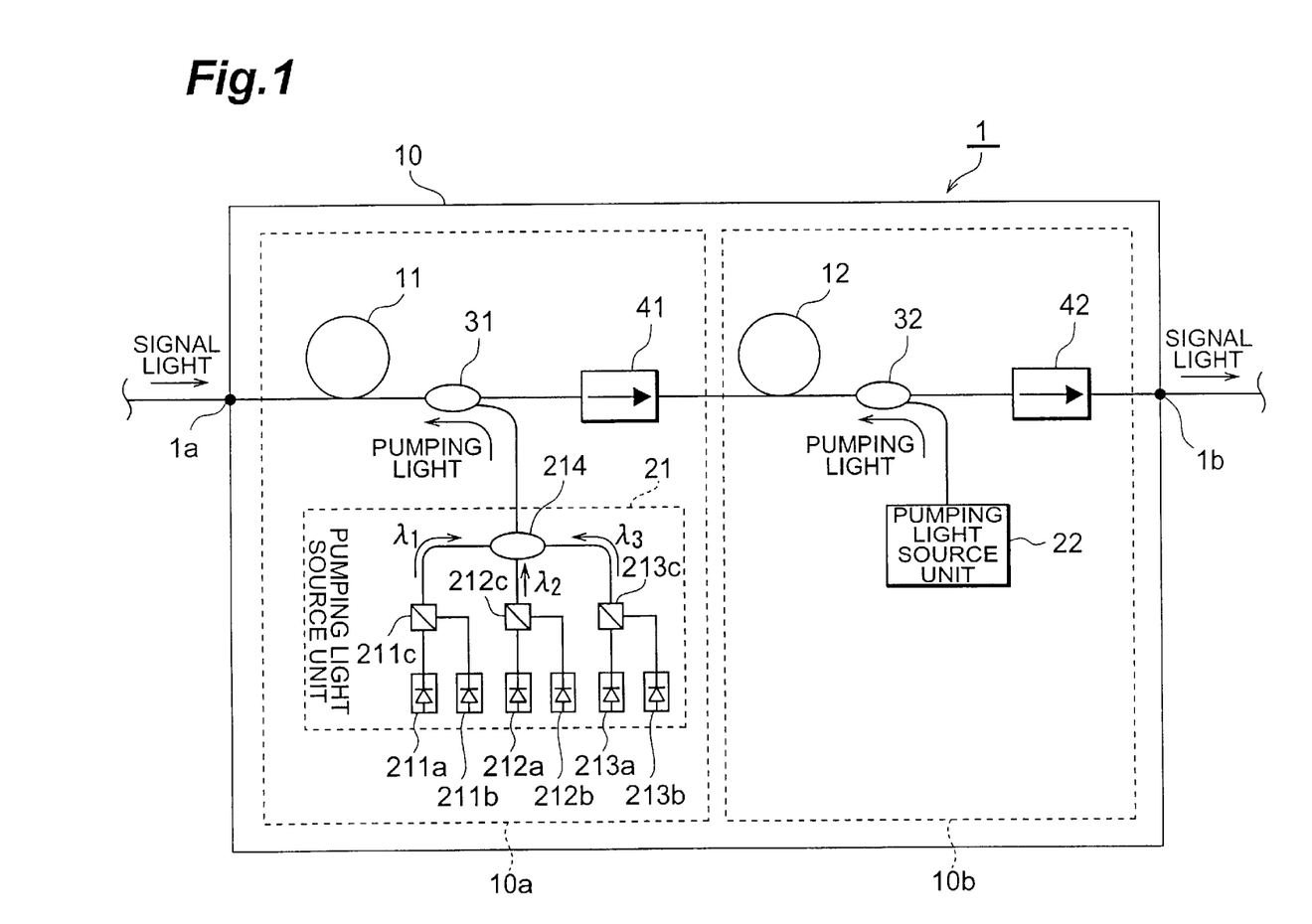
FIG. 1 is a block diagram showing a Raman gain module according to an embodiment.

FIG. 1 is a block diagram showing a Raman gain module according to an embodiment of the present invention. A Raman gain module 1 is a lumped optical amplifier installed in, e.g., a relay station of an optical transmission system and comprises two Raman amplification optical fibers 11 and 12, and two pumping light source units 21 and 22. The Raman amplification optical fibers 11 and 12 and pumping light source units 21 and 22 are accommodated in a housing 10 as a module case.

The Raman amplification optical fibers 11 and 12 are formed from silica-based optical fibers having different wavelength dispersion values. The Raman amplification optical fibers 11 and 12 are connected in series in this order from an input terminal 1a to an output terminal 1b of the Raman gain module 1.

When the Raman amplification optical fibers 11 and 12 are transmitting signal light and receiving pumping light, an optical transmission path (optical fiber line) in the Raman gain module 1 is formed to Raman-amplify signal light in a predetermined amplification wavelength band by the pumping light. Additionally, wavelength dispersion in the Raman gain module 1 is controlled such that a predetermined condition is satisfied by, e.g., reducing accumulation of dispersion into signal light to be Raman-amplified or signal light transmission in an almost zero dispersion state by combining the wavelength dispersion values of the Raman amplification optical fibers 11 and 12.

Optical isolators 41 and 42 are arranged on the output sides of the Raman amplification optical fibers 11 and 12, respectively. Each of the optical isolators 41 and 42 passes light in the forward direction (direction of the arrow shown in FIG. 1) but not in the reverse direction. That is, the optical isolator 41 passes light from the Raman amplification optical fiber 11 to the Raman amplification optical fiber 12 but not in the reverse direction. The optical isolator 42 passes light from the Raman amplification optical fiber 12 to the output terminal 1b but not in the reverse direction.

Pumping light components to the Raman amplification optical fibers 11 and 12 are supplied from the pumping light source units 21 and 22 serving as pumping light supply means, respectively. The pumping light source units 21 and 22 are connected to the optical transmission path in the Raman gain module 1 through optical multiplexers 31 and 32 inserted between the Raman amplification optical fiber 11 and the optical isolator 41 and between the Raman amplification optical fiber 12 and the optical isolator 42, respectively.

The optical multiplexers 31 and 32 pass pumping light components supplied from the pumping light source units 21 and 22 in the reverse direction toward the Raman amplification optical fibers 11 and 12 on the input side, respectively. The optical multiplexers 31 and 32 pass signal light components from the Raman amplification optical fibers 11 and 12 in the forward direction toward the optical isolators 41 and 42, respectively. With this arrangement, the Raman gain module 1 is constructed as a backward pumping (back pumping) optical amplifier.

Referring to FIG. 1, the detailed structure of the pumping light source unit 21 for supplying pumping light to the Raman amplification optical fiber 11 is illustrated. In this embodiment, six light sources 211a, 211b, 212a, 212b, 213a, and 213b for optical pumping are used. Although not illustrated, the pumping light source unit 22 has the same structure as that of the pumping light source unit 21.

Of the six pumping light sources of the pumping light source unit 21, the pumping light sources 211a and 211b output light components having the same wavelength $\lambda_1$. The light components from the pumping light sources 211a and 211b are synthesized by an optical polarization synthesizer 211c, so pumping light having the wavelength $\lambda_1$ with a uniform polarization state is generated. Similarly, the pumping light sources 212a and 212b output light components having the same wavelength $\lambda_2$ ($\lambda_2 \neq \lambda_1$), which are synthesized by an optical polarization synthesizer 212c, so pumping light having the wavelength $\lambda_2$ with a uniform polarization state is generated. The pumping light sources 213a and 213b output light components having the same wavelength $\lambda_3$ ($\lambda_3 \neq \lambda_1, \lambda_2$), which are synthesized by an optical polarization synthesizer 213c, so pumping light having the wavelength $\lambda_3$ with a uniform polarization state is generated.

The light components having the wavelengths $\lambda_1$, $\lambda_1$, and $\lambda_3$ synthesized by the optical polarization synthesizers 211c, 212c, and 213c are synthesized into pumping light having three wavelength components by a wavelength synthesizer 214 and supplied to the Raman amplification optical fiber 11 through the optical multiplexer 31.

For the arrangement of the pumping light source unit, the wavelength of pumping light, the number of pumping light sources, and the like are preferably appropriately set in accordance with the amplification wavelength band required for the Raman amplifier. More specifically, as the wavelength of pumping light to be supplied from the pumping light source unit to the Raman amplification optical fiber, normally, a wavelength shorter than the wavelength of signal light by about 0.1 $\mu$m is used. As the number of pumping light sources, a necessary number of pumping light sources (a necessary number of wavelengths) are used to allow optical amplification at each wavelength in the amplification wavelength band of the Raman amplifier. For example, when optical amplification throughout the amplification wavelength band can be executed by pumping light having one wavelength, the pumping light can have only one wavelength component.

In the above-described Raman gain module 1, the plurality of Raman amplification optical fibers, i.e., two Raman amplification optical fibers 11 and 12 in FIG. 1, are connected in series to form the optical transmission path in the Raman gain module 1, and the Raman amplification optical fibers have different wavelength dispersion values. According to this arrangement, the wavelength dispersion in the Raman gain module 1 can be controlled using the combination of the wavelength dispersion values of the Raman amplification optical fibers 11 and 12, thereby preventing any unwanted condition such as accumulation of dispersion into signal light or transmission in an almost zero dispersion state. Hence, a Raman gain module can be implemented in which degradation in signal light transmission quality in the amplifier due to the nonlinear optical effect is suppressed.

For accumulation of dispersion into the signal light in the optical transmission path of the Raman gain module 1, the absolute value of the dispersion value obtained by accumulating the wavelength dispersion in the Raman amplification optical fibers 11 and 12 from the input terminal 1a to the output terminal 1b preferably falls within the range of 1 ps/nm or less, and more preferably, 0.5 ps/nm or less, in at least partial wavelength band of the amplification wavelength band. This corresponds to setting the minimum value of the dispersion values in the amplification wavelength band to 1 ps/nm or less, or 0.5 ps/nm or less.

In the entire wavelength band of the amplification wavelength band, the absolute value of the dispersion value obtained by accumulating wavelength dispersion from the input terminal 1a to the output terminal 1b preferably falls within the range of 5.0 ps/nm or less. This corresponds to setting the maximum value of the dispersion values in the amplification wavelength band to 5.0 ps/nm or less.

When the sum of the dispersion values accumulated through the Raman amplification optical fibers 11 and 12, i.e., the dispersion value of the entire optical transmission path in the Raman gain module 1 falls within the above range, wavelength dispersion in the entire optical transmission path in which the two Raman amplification optical fibers 11 and 12 having different wavelength dispersion values are connected is sufficiently compensated for. Hence, degradation in signal light transmission quality due to SPM (Self Phase Modulation) or GVD (Group Velocity Dispersion) is suppressed.

For signal light transmission in an almost zero dispersion state in the optical transmission path of the Raman gain module 1, the plurality of Raman amplification optical fibers 11 and 12 preferably have wavelength dispersion values having different signs (if two Raman amplification optical fibers are used, one has a positive wavelength dispersion value, and the other has a negative wavelength dispersion value).

In the optical transmission path formed by connecting the Raman amplification optical fibers 11 and 12 having wavelength dispersion values with opposite signs, even when the absolute values of wavelength dispersion values in the Raman amplification optical fibers 11 and 12 are large to some extent, the wavelength dispersion can be compensated for in the entire optical transmission path of the amplifier module 1 by combining the wavelength dispersion values with the opposite signs. Hence, signal light transmission in an almost zero dispersion state can be avoided as much as possible, and degradation in signal light transmission quality due to XPM (Cross Phase Modulation) or FWM (Four Wave Mixing) is suppressed.

In the Raman gain module 1 shown in FIG. 1, the Raman amplification optical fibers 11 and 12 and pumping light source units 21 and 22 are accommodated in the single housing 10. However, the housing may have another form as long as it can be used as a lumped-type amplifier module. As an example of such a form, a housing 10a for accommodating the Raman amplification optical fiber 11 and pumping light source unit 21 and a housing 10b for accommodating the Raman amplification optical fiber 12 and pumping light source unit 22 may be used to form the entire housing, as illustrated in FIG. 1 by dashed lines.

Figure 2A:
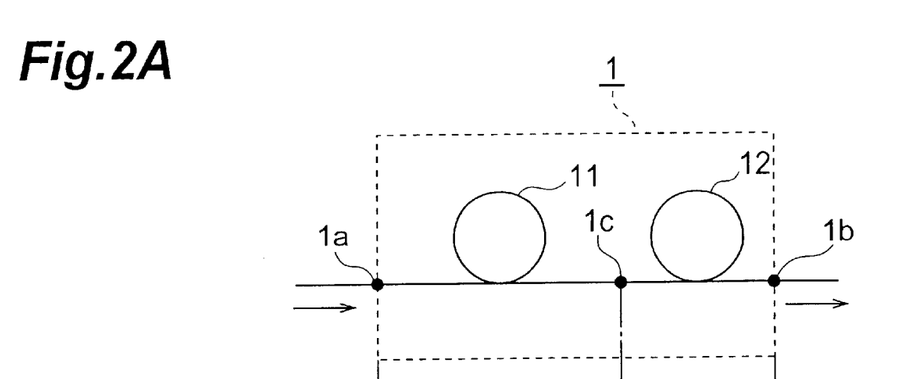
FIGS. 2A and 2B are a view and graph showing an example of wavelength dispersion in the optical transmission path in the Raman gain module shown in FIG. 1.
Figure 2B:
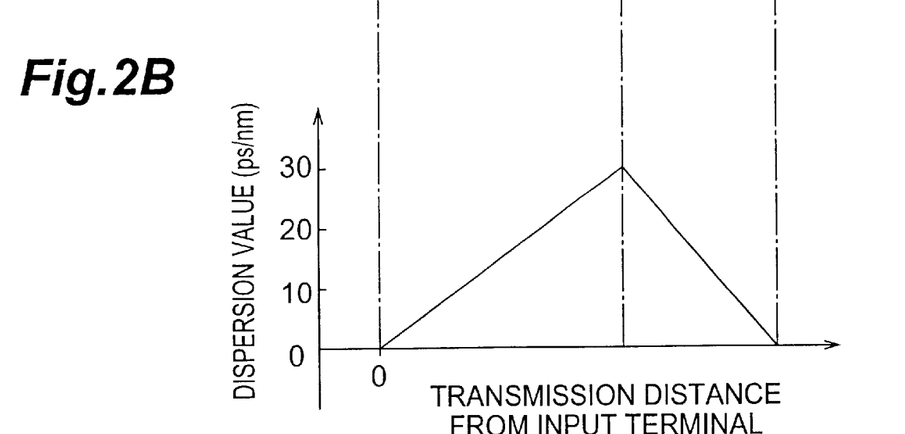

The combination of Raman amplification optical fibers in the Raman gain module shown in FIG. 1 will be described in more detail. FIGS. 2A and 2B are a view and graph schematically showing an example of wavelength dispersion in the optical fiber transmission path in the Raman gain module shown in FIG. 1. FIG. 2A shows the simplified arrangement of the Raman gain module 1 including only the Raman amplification optical fibers 11 and 12. The pumping light source units 21 and 22, optical multiplexers 31 and 32, and optical isolators 41 and 42 are not illustrated. A point 1c in FIG. 2A represents an intermediate point at which the Raman amplification optical fibers 11 and 12 are connected.

In the example shown in FIG. 2A, an optical fiber having a positive wavelength dispersion value is used as the Raman amplification optical fiber 11 on the input terminal 1a side. With this arrangement, as indicated by the change in corresponding dispersion value in FIG. 2B, the dispersion value cumulatively increases as the transmission distance increases from the input terminal 1a to the intermediate point 1c, and a dispersion value of about 30 ps/nm is obtained at the intermediate point 1c.

On the other hand, an optical fiber having a negative wavelength dispersion value is used as the Raman amplification optical fiber 12 on the output terminal 1b side. With this arrangement, the dispersion value of about 30 ps/nm at the intermediate point 1c cumulatively decreases as the transmission distance increases toward the output terminal 1b, and a dispersion value of about 0 ps/nm is obtained at the output terminal 1b. More specifically, the wavelength dispersion is compensated for such that the absolute value falls within a predetermined range (e.g., 1 ps/nm or less or 5.0 ps/nm or less). With this arrangement, the Raman gain module 1 which suppresses degradation in signal light transmission quality due to the nonlinear optical effect can be obtained, as described above.

Figure 3:
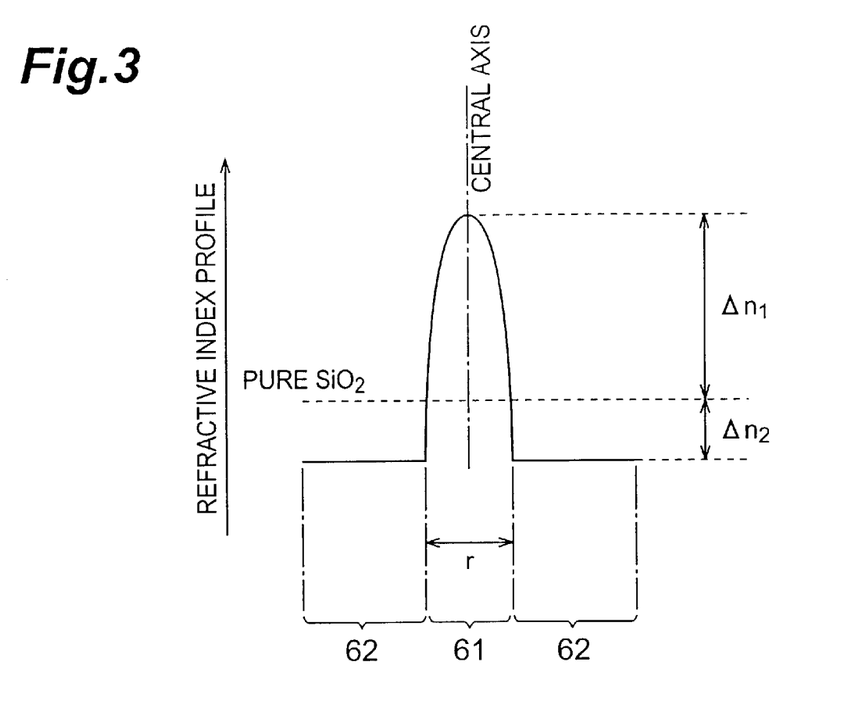
FIG. 3 is a view showing the structure of a Raman amplification optical fiber applied to the Raman gain module.

A specific example of the Raman amplification optical fiber for implementing the Raman amplifier having the arrangement shown in FIGS. 2A and 2B is illustrated in FIG. 3 by the refractive index profile. The optical fiber shown in FIG. 3 has a core region 61 formed by doping $GeO_2$ in $SiO_2$ and having a relative refraction index difference $\Delta n_1$ and a cladding region 62 formed by doping F in $SiO_2$ and having a relative refraction index difference $\Delta n_2$.

In the optical fiber with the above structure, the relative refraction index difference of pure $SiO_2$ was defined as 0%, and the relative refraction index differences of the core region 61 and cladding region 62 were set as $\Delta n_1=2.9\%$ and $\Delta n_2=-0.4\%$, and applied to the Raman amplification optical fibers 11 and 12, respectively. Configurations other than the relative refraction index difference were changed between the optical fibers.

More specifically, for the Raman amplification optical fiber 11 on the input side, the core diameter was 4.8 ($\mu$m), wavelength dispersion at a wavelength of 1.55 $\mu$m was 4.3 (ps/nm/km), the effective area at the wavelength of 1.55 $\mu$m was 10.8 ($\mu m^2$), and the nonlinear coefficient was 20.4 (1/W/km).

For the Raman amplification optical fiber 12 on the output side, the core diameter was 4.0 ($\mu$m), wavelength dispersion at a wavelength of 1.55 $\mu$m was −9.0 (ps/nm/km), the effective area at the wavelength of 1.55 $\mu$m was 9.9 ($\mu m^2$), and the nonlinear coefficient was 22.3 (1/W/km).

When the Raman amplification optical fibers 11 and 12 with the above structures are used, the Raman gain module 1 with the wavelength dispersion shown in FIG. 2B can be constructed. As is apparent from the wavelength dispersion values, in the case shown in FIGS. 2A and 2B wherein the dispersion value at the intermediate point 1c is about 30 ps/nm, the length of the Raman amplification optical fiber 11 is about 6.98 km, and the length of the Raman amplification optical fiber 12 is about 3.33 km.

In the entire wavelength band of the amplification wavelength band, the absolute value of the dispersion value obtained by accumulating the wavelength dispersion from the input terminal 1a to an arbitrary position preferably falls within the range of 150 ps/nm or less. This corresponds to setting the maximum value of the dispersion value at each position on the optical transmission path in the Raman gain module 1 to 150 ps/nm or less, as in the example illustrated in FIGS. 2A and 2B.

If the optical transmission path from the input terminal 1a to the output terminal 1b has a position where the dispersion value becomes too large, the signal light transmission quality degrades due to SPM or GVD regardless of compensation of wavelength dispersion in the entire optical transmission path. However, when a predetermined condition is imposed on the dispersion value even at each position on the optical transmission path, degradation in transmission quality during signal light transmission can be suppressed. When the two Raman amplification optical fibers 11 and 12 are used, as shown in FIGS. 1 and 2A, the condition is satisfied by setting the wavelength dispersion value accumulated until the intermediate point 1c at which the Raman amplification optical fibers are connected to 150 ps/nm or less.

The dispersion slope value in each of the Raman amplification optical fibers 11 and 12 preferable falls within the range of $-0.5$ ps/nm$^2$/km to $0.1$ ps/nm$^2$/km.

For example, when the Raman gain module 1 is constructed using the optical fibers of the above detailed example, wavelength dispersion can be compensated for at a wavelength of 1.55 $\mu$m. However, if the absolute value of each dispersion slope value is large, the wavelength dispersion can hardly be compensated for in a wavelength band apart from the wavelength of 1.55 $\mu$m in the amplification wavelength band. When the dispersion slope value is sufficiently small, the wavelength dispersion can be sufficiently compensated for in the whole amplification wavelength band.

Additionally, in the entire wavelength band of the amplification wavelength band, the absolute value of the wavelength dispersion value of each of the Raman amplification optical fibers 11 and 12 is preferably set to be equal to or larger than a predetermined lower limit value of wavelength dispersion and, more preferably, to 10 ps/nm/km or more, excluding a range near 0 ps/nm. With this arrangement, in the optical transmission path of the amplifier module 1, degradation in signal light transmission quality due to transmission in an almost zero dispersion state can be reliably prevented. The absolute value of the lower limit value of wavelength dispersion may be 0.5 ps/nm/km or more.

The length of at least one of the Raman amplification optical fibers 11 and 12 is set to 5 km or less. When the length of each of the Raman amplification optical fibers 11 and 12, i.e., the length of the optical transmission path in the amplifier module 1 is shortened as much as possible, degradation in signal light transmission quality due to the nonlinear optical effect can be further reduced. Noise light which causes degradation in transmission quality independently of the nonlinear optical effect is also reduced. In this case, the length of each of the Raman amplification optical fibers 11 and 12 is preferably 5 km or less.

In the optical fiber used as the Raman amplification optical fiber, the effective area of at least one of the Raman amplification optical fibers is preferably set to 15 $\mu$m$^2$ or less at the wavelength of pumping light for Raman amplification.

Further, of the plurality of Raman amplification optical fibers, the Raman amplification optical fiber which has the largest nonlinear coefficient is preferably installed at the nearest position to a position where pumping light is supplied from the pumping light source unit.

When the above-described condition is imposed on the effective area or nonlinear coefficient, or both of them of the optical fiber used as the Raman amplification optical fiber, the Raman gain of the amplifier can be improved.

Figure 4:
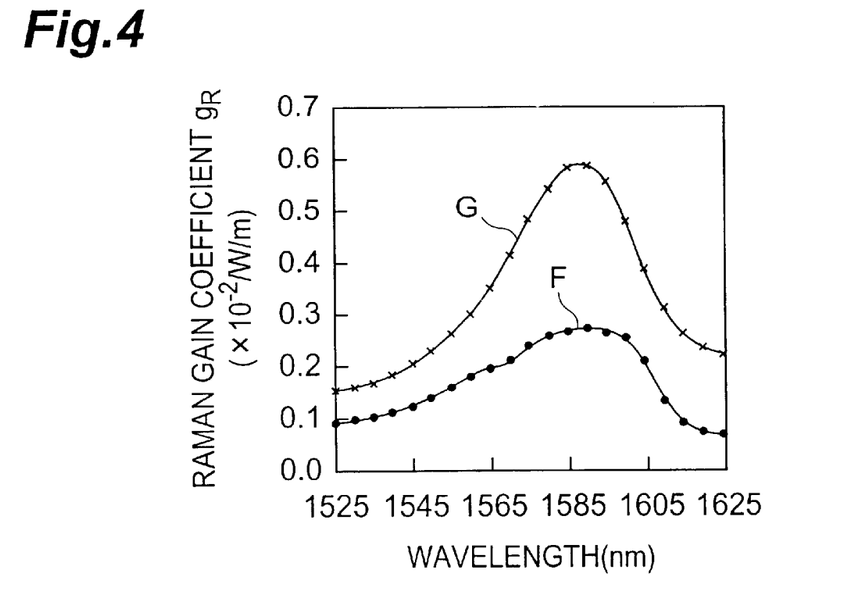
FIG. 4 is a graph showing a Raman gain coefficient in the Raman amplification optical fiber.

FIG. 4 is a graph showing a Raman gain coefficient $g_R$ in a wavelength band of 1525 to 1625 nm when pumping light having a wavelength of 1.48 $\mu$m is used. A graph F represents the Raman gain coefficient $g_R$ by a normal 1.3-$\mu$m zero dispersion single-mode fiber. A graph G represents the Raman gain coefficient $g_R$ when a optical fiber with high nonlinearity whose effective area at the pumping light wavelength is 10 $\mu$m$^2$ is used.

As is apparent from the graphs F and G, when the optical fiber having a small effective area at the pumping light wavelength and a large nonlinear coefficient is used, the Raman amplification efficiency by induced Raman scattering can be improved, and a high Raman gain can be obtained by the amplifier. At this time, noise light and degradation in transmission quality in the Raman amplification optical fiber can also be further reduced because, e.g., the length of the Raman amplification optical fiber for ensuring the Raman gain required for the Raman amplifier can be shortened.

As for setting the Raman amplification optical fiber having the maximum nonlinear coefficient at the nearest position to the position where pumping light is supplied from the pumping light source unit, when the Raman amplification optical fibers 11 and 12 and the pumping light source units 21 and 22 have identical positional relationships, as shown in FIG. 1, an arbitrary optical fiber may be regarded as an optical fiber having a large nonlinear coefficient. In the arrangement shown in FIG. 1, when the pumping light source unit 21 on the input side is not arranged, and the pumping light source unit 22 on the output side serves as a common pumping light supply means for the Raman amplification optical fibers 11 and 12, the Raman amplification optical fiber 12 close to the pumping light source unit 22 is used as the optical fiber having a large nonlinear coefficient.

For the noise characteristic in the optical transmission path formed from the plurality of Raman amplification optical fibers, optical fibers having different Rayleigh scattering coefficients are preferably used as the plurality of Raman amplification optical fibers. With this arrangement, degradation in signal light transmission quality can be suppressed by combining the wavelength dispersion values, and generation and amplification of noise light due to double Rayleigh scattering can be reduced using the combination of the Rayleigh scattering coefficients. Hence, the noise characteristic of the optical transmission path can also be improved.

In this case, as the arrangement of the optical transmission path, a Raman amplification optical fiber having the smallest Rayleigh scattering coefficient is preferably located at the position closest to the input terminal side. For example, in the Raman gain module 1 having the arrangement shown in FIG. 1, an optical fiber (e.g., optical fiber having a core lightly doped with Ge) with a small Rayleigh scattering coefficient and an emphasis on noise characteristic is used as the Raman amplification optical fiber 11 on the input side. On the other hand, an optical fiber with an emphasis on another characteristic such as the Raman gain is used as the Raman amplification optical fiber 12 on the output side.

When the Raman amplification optical fiber 11 on the input terminal 1a side has a large Rayleigh scattering coefficient, large noise light is generated by the Raman amplification optical fiber 11 on the input side, and the noise light is amplified by the Raman amplification optical fiber 12 on the output side, resulting in an increase in noise light intensity in output signal light. However, when an optical fiber with an emphasis on the noise characteristic is laid out on the input side, and an optical fiber with an emphasis on, e.g., the Raman gain is laid out on the output side, the noise characteristic in the entire amplifier module 1 can be improved.

Figure 5:
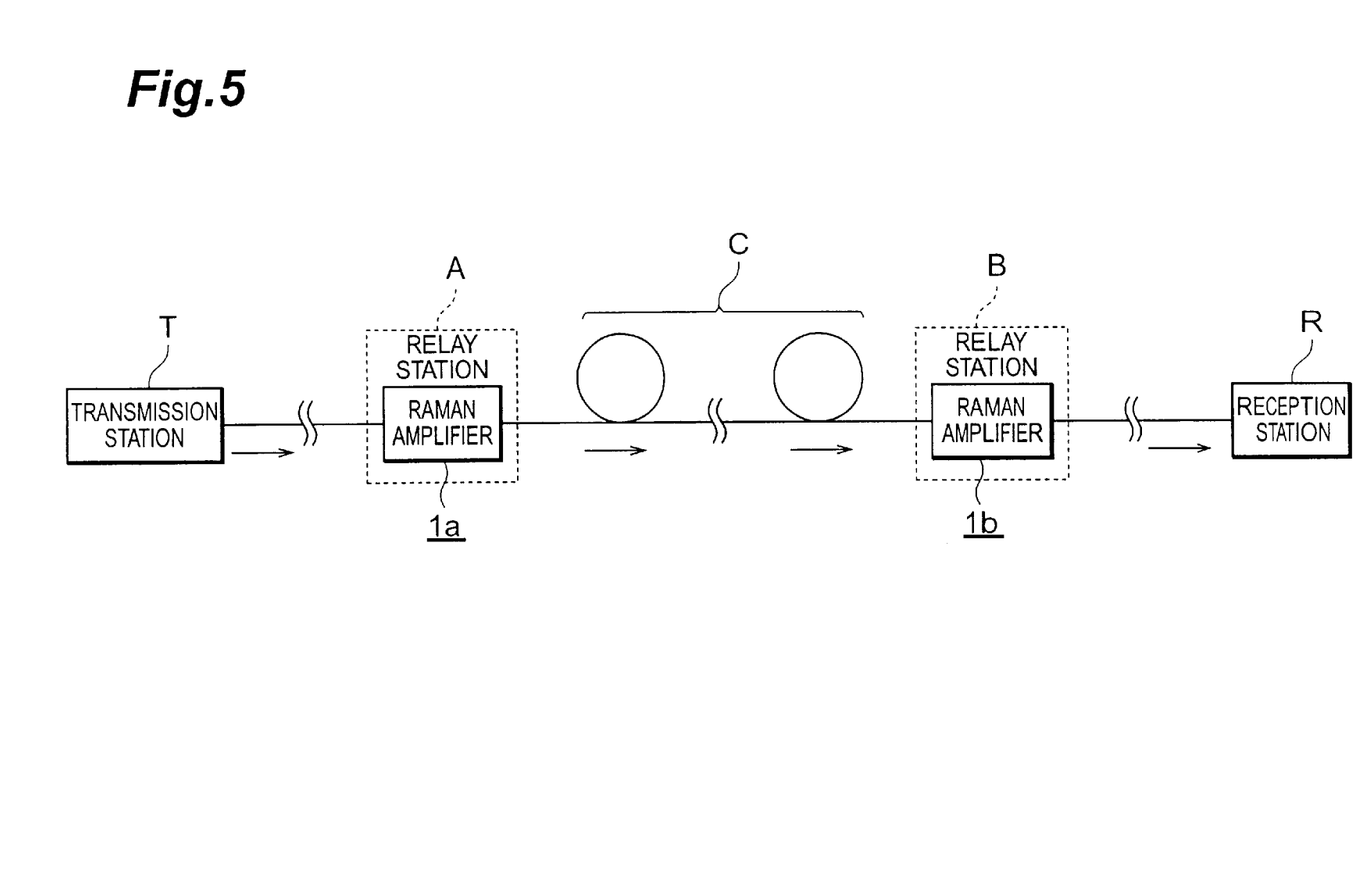
FIG. 5 is a view showing an embodiment of an optical transmission system using the Raman gain module shown in FIG. 1.

An optical transmission system according to the present invention, which uses the above-described Raman amplifier, will be described next. FIG. 5 is a view showing an embodiment of an optical transmission system using the Raman gain module shown in FIG. 1.

In the optical transmission system of this embodiment, on an optical transmission path (optical fiber line) between a transmission station T and a reception station R, two relay stations A and B are sequentially arranged from the transmission station T side. The relay stations A and B relay signal light transmitted through the optical transmission path. The relay stations A and B incorporate Raman gain modules 1a and 1b each having the arrangement shown in FIG. 1, respectively.

When the Raman gain modules 1a and 1b each having the arrangement shown in FIG. 1 are used as a lumped optical amplifiers installed in the relay stations A and B of the optical transmission system, an optical transmission system which suppresses degradation in signal light transmission quality and can reliably transmit signal light from the transmission station T to the reception station R can be implemented.

An optical transmission path C between the two relay stations A and B is preferably formed as an optical transmission path for which necessary dispersion control is performed. The optical transmission path C may include another relay station having a Raman amplifier or the like.

The Raman gain module according to the present invention, and the optical transmission system using the Raman gain module are not limited to the above embodiments, and various changes and modifications can be made.

Figure 6:
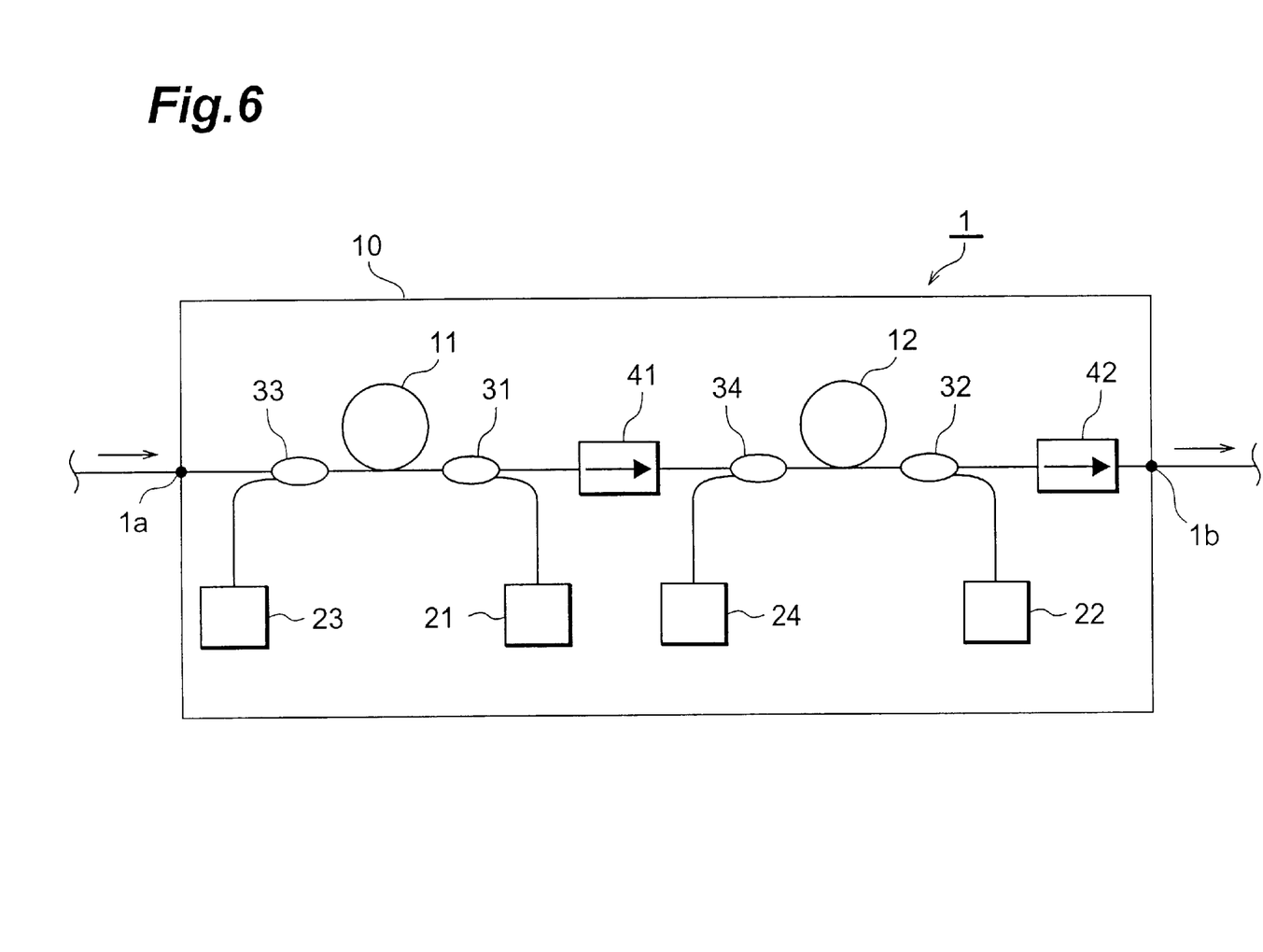
FIG. 6 is a block diagram showing a Raman gain module according to another embodiment.
Figure 7:
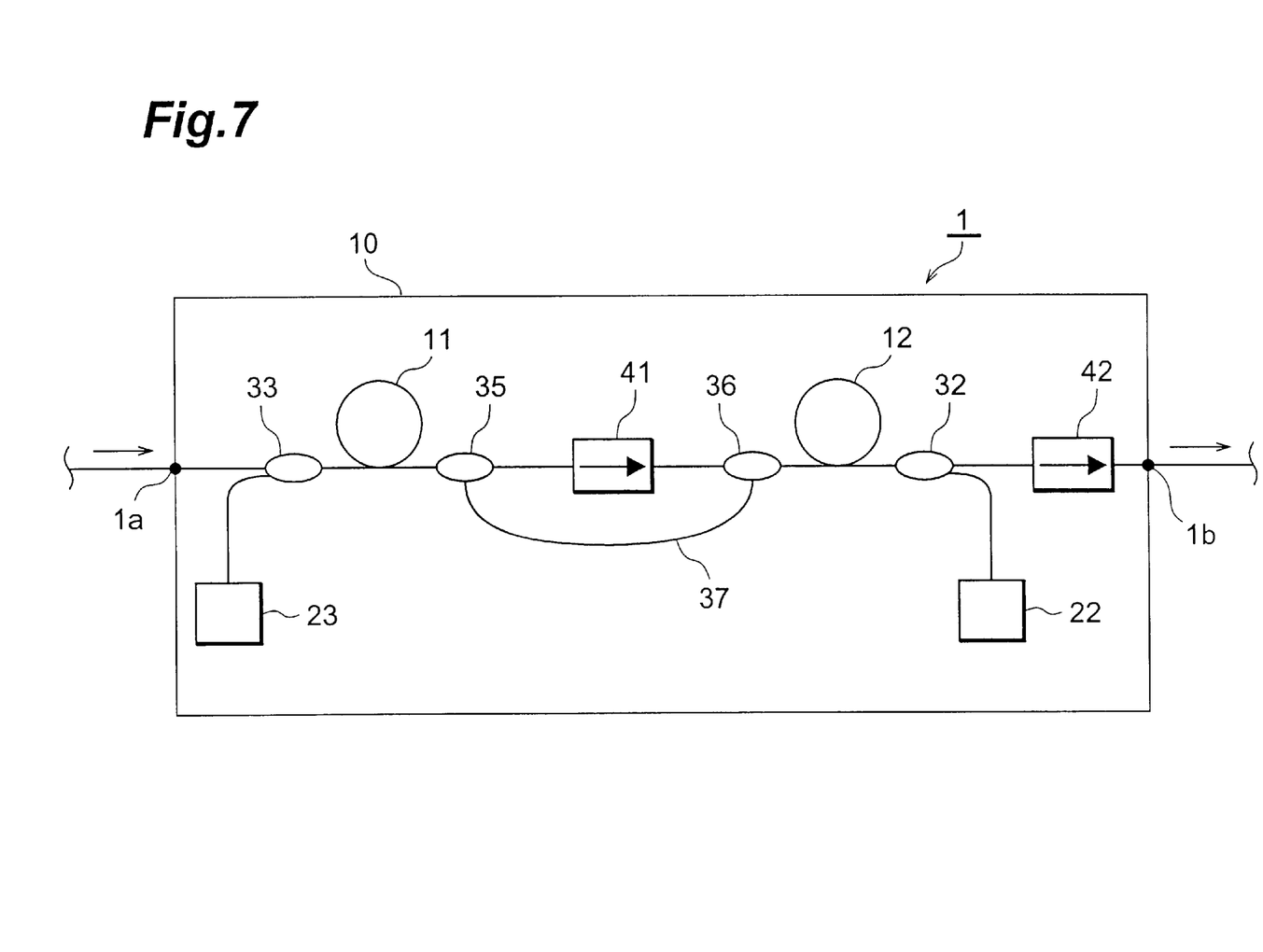
FIG. 7 is a block diagram showing a Raman gain module according to still another embodiment.

FIGS. 6 and 7 are block diagrams showing other embodiments as modifications to the Raman gain module.

Of these Raman gain modules, in the Raman gain module shown in FIG. 6, two more pumping light source units 23 and 24 are added to the arrangement shown in FIG. 1. Of these pumping light source units, the pumping light source unit 23 is connected to the optical transmission path through an optical multiplexer 33 inserted between an input terminal 1a and a Raman amplification optical fiber 11 so as to supply pumping light to the Raman amplification optical fiber 11 in the forward direction. The pumping light source unit 24 is connected to the optical transmission path through an optical multiplexer 34 inserted between an optical isolator 41 and a Raman amplification optical fiber 12 so as to supply pumping light to the Raman amplification optical fiber 12 in the forward direction. With this arrangement, a Raman gain module 1 shown in FIG. 6 is constructed as a two-way pumping optical amplifier.

In the Raman gain module shown in FIG. 7, as pumping light source units, a pumping light source unit 23 on the input side of a Raman amplification optical fiber 11 and a pumping light source unit 22 on the output side of a Raman amplification optical fiber 12 are arranged. In addition, optical multiplexers/demultiplexers 35 and 36 are inserted between the Raman amplification optical fiber 11 and an optical isolator 41 and between the optical isolator 41 and the Raman amplification optical fiber 12, respectively.

The optical multiplexers/demultiplexers 35 and 36 multiplex/demultiplex the light components of the wavelengths of pumping light supplied from the pumping light source units 22 and 23. In addition, an optical transmission path 37 serving as a bypass for detouring pumping light from the pumping light source units 22 and 23 is formed between the optical multiplexers/demultiplexers 35 and 36. With this arrangement, a Raman gain module 1 shown in FIG. 7 is constructed as a two-way pumping optical amplifier in which the pumping light from each of the pumping light source units 22 and 23 is supplied to both the two Raman amplification optical fibers 11 and 12.

Other than these modifications, the arrangement can be changed in various ways. For example, as the pumping light source unit, a single pumping light source unit may be arranged for two Raman amplification optical fibers. If the optical isolators 41 and 42 are unnecessary, they may be omitted. Alternatively, the optical isolators and optical multiplexers may be integrated to reduce the loss.

The number of the plurality of Raman amplification optical fibers connected in series is not limited to two, and three or more Raman amplification optical fibers may be used. In this case, the arrangement of the Raman gain module becomes relatively complex. However, since the degree of freedom of a combination of wavelength dispersion values or Rayleigh scattering coefficients increases, controllability for these characteristics improves. The above-described conditions about the dispersion values and the like of the two Raman amplification optical fibers also apply to the arrangement using three or more Raman amplification optical fibers.

Figures 8A, 8B:
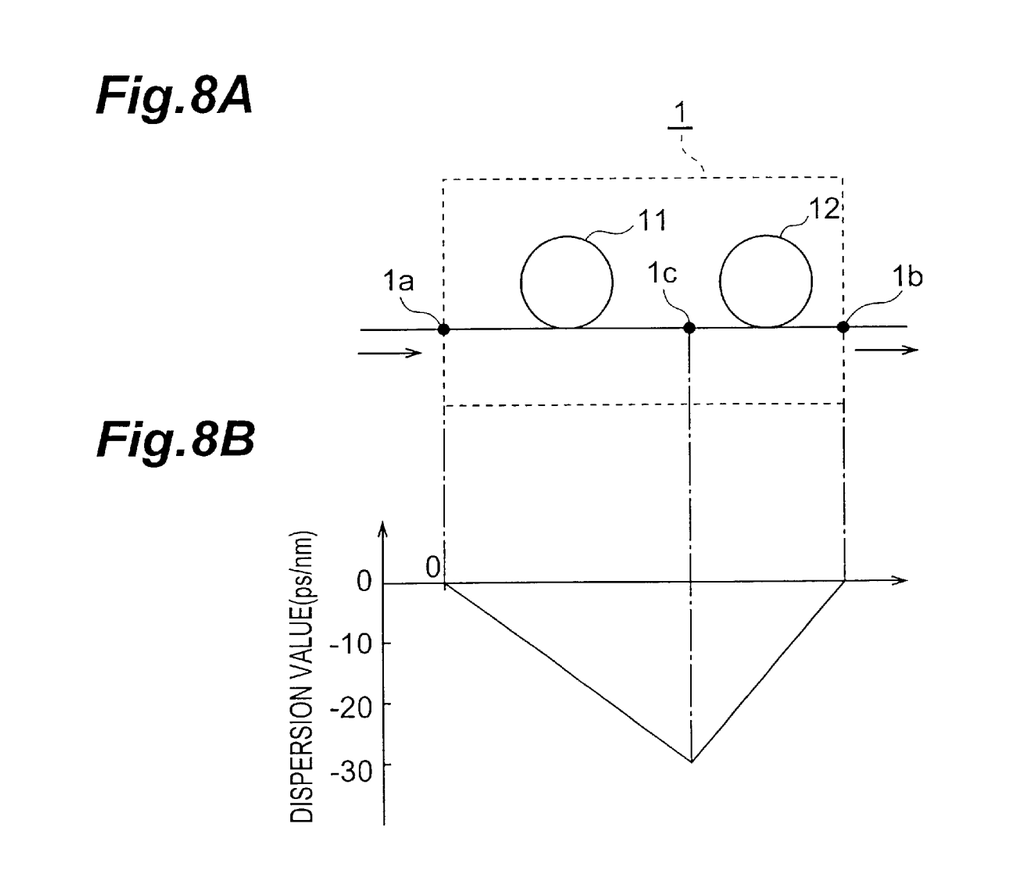
FIGS. 8A and 8B are a view and graph showing another example of wavelength dispersion in the optical transmission path in the Raman gain module shown in FIG. 1.

The wavelength dispersion structure in the optical fiber transmission path in the Raman gain module is not limited to that shown in FIGS. 2A and 2B, and various structures can be used in accordance with the relationship with another characteristic. For example, referring to FIGS. 2A and 2B, the Raman amplification optical fiber 11 on the input side has a positive wavelength dispersion value, and the Raman amplification optical fiber 12 on the output side has a negative wavelength dispersion value. To the contrary, as shown in FIGS. 8A and 8B, the Raman amplification optical fiber 11 on the input side may have a negative wavelength dispersion value, and the Raman amplification optical fiber 12 on the output side may have a positive wavelength dispersion value.

For structural conditions other than the wavelength dispersion, e.g., the nonlinear coefficient of the Raman amplification optical fiber, Rayleigh scattering coefficient, dispersion slope, optical fiber length, and the like, an appropriate combination is preferably selected in accordance with the correlation between the conditions or detailed characteristic conditions required for each Raman gain module.

The Raman gain module according to the present invention and the optical transmission system using the Raman gain module obtain the following effects, as described above in detail. That is, according to the lumped Raman gain module formed by connecting in series a plurality of Raman amplification optical fibers having different wavelength dispersion values, wavelength dispersion in the optical transmission path in the amplifier is controlled by combining the wavelength dispersion values, so accumulation of dispersion into signal light or transmission in an almost zero dispersion state can be reduced. Hence, a Raman gain module in which degradation in signal light transmission quality due to the nonlinear optical effect is suppressed, and an optical transmission system using the Raman gain module can be implemented.

In the Raman amplifier having the above arrangement, since wavelength dispersion is controlled in the amplifier module, the characteristics can be improved, and the Raman amplifier can easily be applied to a relay station or the like. In addition, since the degree of freedom of characteristic control is high, Raman gain modules having various characteristics suitable for various application purposes can be provided.

What is claimed is:

1. A lumped-type Raman gain module for Raman-amplifying signal light in a predetermined amplification wavelength band by pumping light, characterized by comprising:

a plurality of Raman amplification optical fibers connected in series to Raman-amplify the signal light in the amplification wavelength band and having different wavelength dispersion values;

one or a plurality of pumping light supply means for supplying the pumping light to said plurality of Raman amplification optical fibers, respectively; and a housing for accommodating said plurality of Raman amplification optical fibers and said one or plurality of pumping light supply means.

2. A module according to claim 1, characterized in that at least in a partial wavelength band of the amplification wavelength band, an absolute value of a dispersion value obtained by accumulating the wavelength dispersion values of said plurality of Raman amplification optical fibers from an input terminal to an output terminal is not more than 1 ps/nm.

3. A module according to claim 1, characterized in that in an entire wavelength band of the amplification wavelength band, an absolute value of a dispersion value obtained by accumulating the wavelength dispersion values of said plurality of Raman amplification optical fibers from an input terminal to an output terminal is not more than 5.0 ps/nm.

4. A module according to claim 1, characterized in that in an entire wavelength band of the amplification wavelength band, an absolute value of a dispersion value obtained by accumulating the wavelength dispersion values of said plurality of Raman amplification optical fibers from an input terminal to an arbitrary position is not more than 150 ps/nm for each position.

5. A module according to claim 1, characterized in that a dispersion slope value in each of said plurality of Raman amplification optical fibers falls within a range of −0.5 ps/nm$^2$/km to 0.1 ps/nm$^2$/km.

6. A module according to claim 1, characterized in that said plurality of Raman amplification optical fibers include at least two Raman amplification optical fibers having the wavelength dispersion values with opposite signs.

7. A module according to claim 1, characterized in that said plurality of Raman amplification optical fibers comprise two Raman amplification optical fibers, one of which has a positive wavelength dispersion value, and the other of which has a negative wavelength dispersion value.

8. A module according to claim 1, characterized in that in an entire wavelength band of the amplification wavelength band, an absolute value of the wavelength dispersion value of each of said plurality of Raman amplification optical fibers is not less than 10 ps/nm/km.

9. A module according to claim 1, characterized in that said plurality of Raman amplification optical fibers have different Rayleigh scattering coefficients.

10. A module according to claim 9, characterized in that of said plurality of Raman amplification optical fibers, a Raman amplification optical fiber having the smallest Rayleigh scattering coefficient is laid out at a position closest to an input terminal.

11. A module according to claim 1, characterized in that at least one of said plurality of Raman amplification optical fibers has a length of not more than 5 km.

12. A module according to claim 1, characterized in that at least one of said plurality of Raman amplification optical fibers has an effective area of not more than 15 $\mu$m$^2$ at a wavelength of the pumping light.

13. A module according to claim 1, characterized in that of said plurality of Raman amplification optical fibers, a Raman amplification optical fiber having the largest nonlinear coefficient is laid out at a position closest to a position where the pumping light is supplied from said pumping light supply means.

14. An optical transmission system characterized by comprising an optical transmission path formed using an optical fiber through which signal light is transmitted, wherein said Raman gain module of claim 1 is installed in a relay station for relaying the signal light transmitted through the optical transmission path.

* * * * *